(12) United States Patent
Touma

(10) Patent No.: US 11,179,785 B2
(45) Date of Patent: Nov. 23, 2021

(54) CUTTING INSERT AND INDEXABLE EDGE ROTARY CUTTING TOOL

(71) Applicant: MOLDINO Tool Engineering, Ltd., Tokyo (JP)

(72) Inventor: Syoujirou Touma, Narita (JP)

(73) Assignee: MOLDINO TOOL ENGINEERING, LTD., Tokyo (JP)

(*) Notice: Subject to any disclaimer, the term of this patent is extended or adjusted under 35 U.S.C. 154(b) by 224 days.

(21) Appl. No.: 16/347,340

(22) PCT Filed: Dec. 11, 2017

(86) PCT No.: PCT/JP2017/044397
§ 371 (c)(1),
(2) Date: May 3, 2019

(87) PCT Pub. No.: WO2018/105752
PCT Pub. Date: Jun. 14, 2018

(65) Prior Publication Data
US 2019/0283149 A1    Sep. 19, 2019

(30) Foreign Application Priority Data

Dec. 9, 2016 (JP) .............................. JP2016-239485

(51) Int. Cl.
*B23C 5/20* (2006.01)
*B23C 5/10* (2006.01)

(52) U.S. Cl.
CPC .................. *B23C 5/10* (2013.01); *B23C 5/20* (2013.01); *B23C 5/207* (2013.01);
(Continued)

(58) Field of Classification Search
CPC .... B23C 2200/0438; B23C 2200/0433; B23C 2200/083; B23C 2200/081;
(Continued)

(56) References Cited

U.S. PATENT DOCUMENTS 4,966,500 A * 10/1990 Tsujimura ............. B23C 5/2221
                                                      407/113
5,460,464 A * 10/1995 Arai ........................ B23C 5/109
                                                      407/114
(Continued)

FOREIGN PATENT DOCUMENTS

CN    101745675 A    6/2010
CN    104640659 A    5/2015
(Continued)

OTHER PUBLICATIONS

Notice of Allowance dated Oct. 29, 2019, issued for the Japanese patent application No. 2018-555092 and English translation thereof.
(Continued)

*Primary Examiner* — Nicole N Ramos
(74) *Attorney, Agent, or Firm* — Locke Lord LLP

(57) ABSTRACT

A cutting insert includes a main surface formed in a substantially parallelogram shape and having a pair of acute angle corner portions and a pair of obtuse angle corner portions, a seating surface that faces a side opposite to the main surface, a side surface that connects the main surface and the seating surface to each other, a corner cutting edge disposed in the acute angle corner portion, and a main cutting edge and a subsidiary cutting edge which are respectively disposed in a pair of side ridge portions of the main surface located each other across the acute angle corner portion. A mounting hole into which the fixing member is inserted penetrates the main surface and the seating surface. The main cutting edge is inclined at an inclination angle equal to or larger than 8° with reference to a plane perpendicular to an axial direction of the mounting hole.

20 Claims, 11 Drawing Sheets

(52) U.S. Cl.
CPC .. *B23C 2200/04* (2013.01); *B23C 2200/0433* (2013.01); *B23C 2200/081* (2013.01)

(58) Field of Classification Search
CPC ........ B23C 2200/283; B23C 2200/286; B23C 5/109; B23C 5/20; B23C 5/202; B23C 5/205; B23C 5/207; B23C 2200/08; B23C 2200/20; B23C 2200/206; B23C 2200/28; B23B 2200/283; B23B 2200/286

See application file for complete search history.

(56) References Cited

U.S. PATENT DOCUMENTS

| | | | |
|---|---|---|---|
| 7,261,497 B2 | 8/2007 | Maeda | |
| 2001/0051077 A1 | 12/2001 | Nagata et al. | |
| 2004/0223818 A1 | 11/2004 | Sheffler et al. | |
| 2008/0170919 A1* | 7/2008 | Dufour | B23C 5/207 407/116 |
| 2009/0311057 A1* | 12/2009 | Yoshida | B23C 5/2221 407/113 |
| 2014/0212228 A1 | 7/2014 | Horiike et al. | |
| 2015/0139743 A1 | 5/2015 | Ballas | |

FOREIGN PATENT DOCUMENTS

| | | | | |
|---|---|---|---|---|
| CN | 104349856 B | * | 5/2016 | ......... B23B 27/1611 |
| EP | 3050655 A1 | | 8/2016 | |
| EP | 3100811 A1 | | 12/2016 | |
| GN | 1484563 A | | 3/2004 | |
| GN | 103842118 A | | 6/2014 | |
| JP | 62-081516 U | | 5/1987 | |
| JP | 10-015720 A | | 1/1998 | |
| JP | 10-100015 A | | 4/1998 | |
| JP | 11333616 A | * | 12/1999 | ............ B23C 5/109 |
| JP | 2002-046010 A | | 2/2002 | |
| JP | 2002-263918 A | | 9/2002 | |
| JP | 2003-260607 A | | 9/2003 | |
| JP | 4489874 B2 | | 6/2010 | |
| JP | 2013-091153 A | | 5/2013 | |
| JP | 2016-537212 A | | 12/2016 | |
| KR | 10-2013-0081912 A | | 7/2013 | |
| KR | 10-2014-0079366 A | | 6/2014 | |
| WO | WO-2011122676 A1 | * | 10/2011 | ............ B23C 5/109 |
| WO | WO-2015115379 A1 | * | 8/2015 | ............ B23C 5/109 |

OTHER PUBLICATIONS

Office Action dated Nov. 15, 2019, issued for the Chinese patent application No. 201780072530.9 and partial English translation of Search Report.
Office Action dated Jan. 15, 2020, issued for the Korean patent application No. 10-2019-7014413 and English translation thereof.
Supplementary European Search Report dated Jul. 15, 2020, issued for European Patent Application No. 17878034.2.
International Search Report dated Feb. 20, 2018, issued for PCT/JP2017/044397 and English translation thereof.

* cited by examiner

CUTTING INSERT AND INDEXABLE EDGE ROTARY CUTTING TOOL

TECHNICAL FIELD

The present invention relates to a cutting insert and an indexable edge rotary cutting tool.

Priority is claimed on Japanese Patent Application No. 2016-239485, filed on Dec. 9, 2016, the content of which is incorporated herein by reference.

BACKGROUND ART

In the related art, a cutting insert (cutting tip) for mechanical processing as disclosed in Patent Document 1 is known.

CITATION LIST

Patent Literature

[Patent Document 1] Japanese Patent (Granted) Publication No. 4489874
[Patent Document 2] Japanese Unexamined Patent Application, First Publication No. 2003-260607

SUMMARY OF INVENTION

Technical Problem

In a cutting insert disclosed in Patent Document 1 and Patent Document 2, a main cutting edge formed on a main surface (upper surface) is inclined toward a seating surface (bottom surface) on a side opposite to the main surface along a longitudinal direction. Therefore, the cutting insert is gradually thinner along the longitudinal direction of the main cutting edge. In addition, the cutting insert is a type having 2 corners. Consequently, a thinnest portion is located on a diagonal line, thereby causing a problem in that the thinnest portion is likely to crack on the diagonal line.

The present invention is made in view of the above-described circumstances, and an object thereof is to provide a cutting insert which reduces cutting resistance of a cutting edge and which is less likely to crack, and an indexable edge rotary cutting tool including the cutting insert.

Solution to Problem

According to an aspect of the present invention, there is provided a cutting insert to be detachably mounted on a tip portion of a tool main body rotating around a rotation axis by using a fixing member. The cutting insert includes a main surface formed in a substantially parallelogram shape in a plan view and having a pair of acute angle corner portions and a pair of obtuse angle corner portions, a seating surface that faces a side opposite to the main surface, a side surface that connects the main surface and the seating surface to each other, a corner cutting edge disposed in the acute angle corner portion, and a main cutting edge and a subsidiary cutting edge which are respectively disposed in a pair of side ridge portions of the main surface located each other across the acute angle corner portion. A mounting hole into which the fixing member is inserted penetrates the main surface and the seating surface. The main cutting edge is inclined at an inclination angle equal to or larger than 8° with reference to a plane perpendicular to an axial direction of the mounting hole so as to be closer to the seating surface side in a direction from the acute angle corner portion toward the obtuse angle corner portion. The main surface has a region inclined in a direction away from the seating surface in a direction from the obtuse angle corner portion toward an edge portion of the mounting hole along a diagonal line connecting the pair of obtuse angle corner portion to each other. In the cutting insert, in a cross section along the diagonal line connecting the pair of obtuse angle corner portions to each other, the main surface may have a projection portion projecting upward from a straight line connecting the obtuse angle corner portion and the edge portion of the mounting hole to each other.

In addition, in the cutting insert, when viewed in the axial direction of the mounting hole, the projection portion may overlap the side ridge portion of the seating surface, or may be located inside the side ridge portion of the seating surface.

In addition, in the cutting insert, a rake angle of the main cutting edge may be inclined to a positive angle side on the acute angle corner portion of the main cutting edge, and gradually increases to a negative angle side in a direction from the acute angle corner portion toward the obtuse angle corner portion, and is inclined to the negative angle side on the obtuse angle corner portion side.

In addition, in the cutting insert, a change point where the rake angle of the main cutting edge is changed from inclination to the positive angle side to inclination to the negative angle side may be located closer to the obtuse angle corner portion in a longitudinal direction of the main cutting edge.

In addition, in the cutting insert, when a distance from the seating surface on the acute angle corner portion side of the main surface is set as L1, and when a distance from the seating surface on the obtuse angle corner portion side of the main surface is set as L2, relationships expressed by the following equations are satisfied.

$$0.4 \leq L2/L1 \leq 0.7$$

$$2.0 \text{ mm} \leq L2 \leq 3.9 \text{ mm}$$

In addition, according to another aspect of the present invention, there is provided an indexable edge rotary cutting tool including a tool main body rotating around a central axis, a mounting seat formed in a tip portion of the tool main body in an axial direction of the rotation axis, and a cutting insert detachably mounted on the mounting seat and having a cutting edge. As the cutting insert, the cutting insert according to the above-described aspect is used. A rake angle in an axial direction of the main cutting edge of the cutting insert is equal to or larger than 15°.

Advantageous Effects of Invention

According to the present invention, it is possible to provide a cutting insert which reduces cutting resistance of a cutting edge and which is less likely to crack, and an indexable edge rotary cutting tool including the cutting insert.

DESCRIPTION OF EMBODIMENTS

Figure 1:
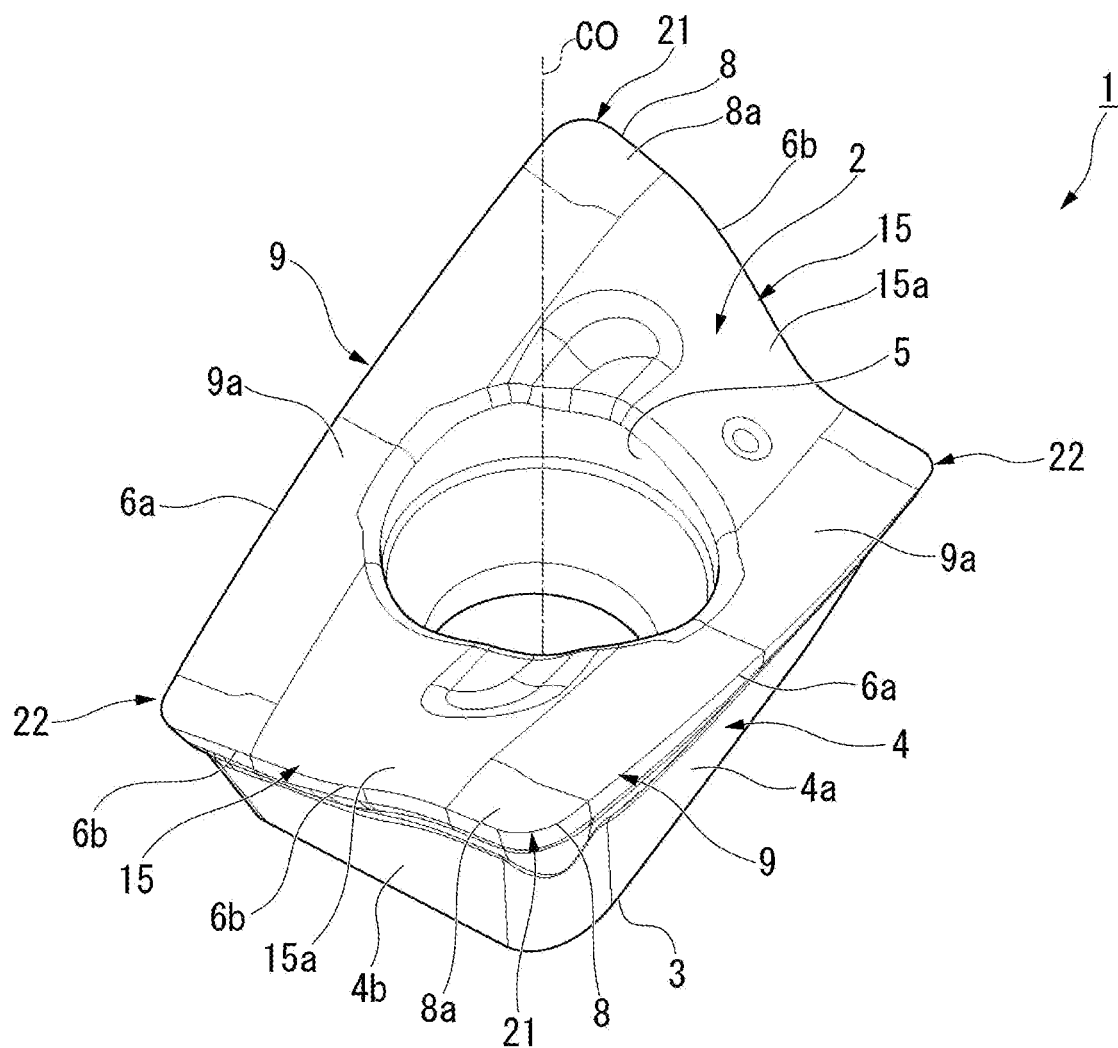
FIG. 1 is a perspective view showing a cutting insert according to an embodiment.

Hereinafter, an embodiment to which the present invention is applied will be described in detail with reference to the drawings. In the drawings used in the following description, in order to facilitate understanding of characteristic elements, no characteristic elements may be omitted in the illustration for the sake of convenience, in some cases.

Figure 2:
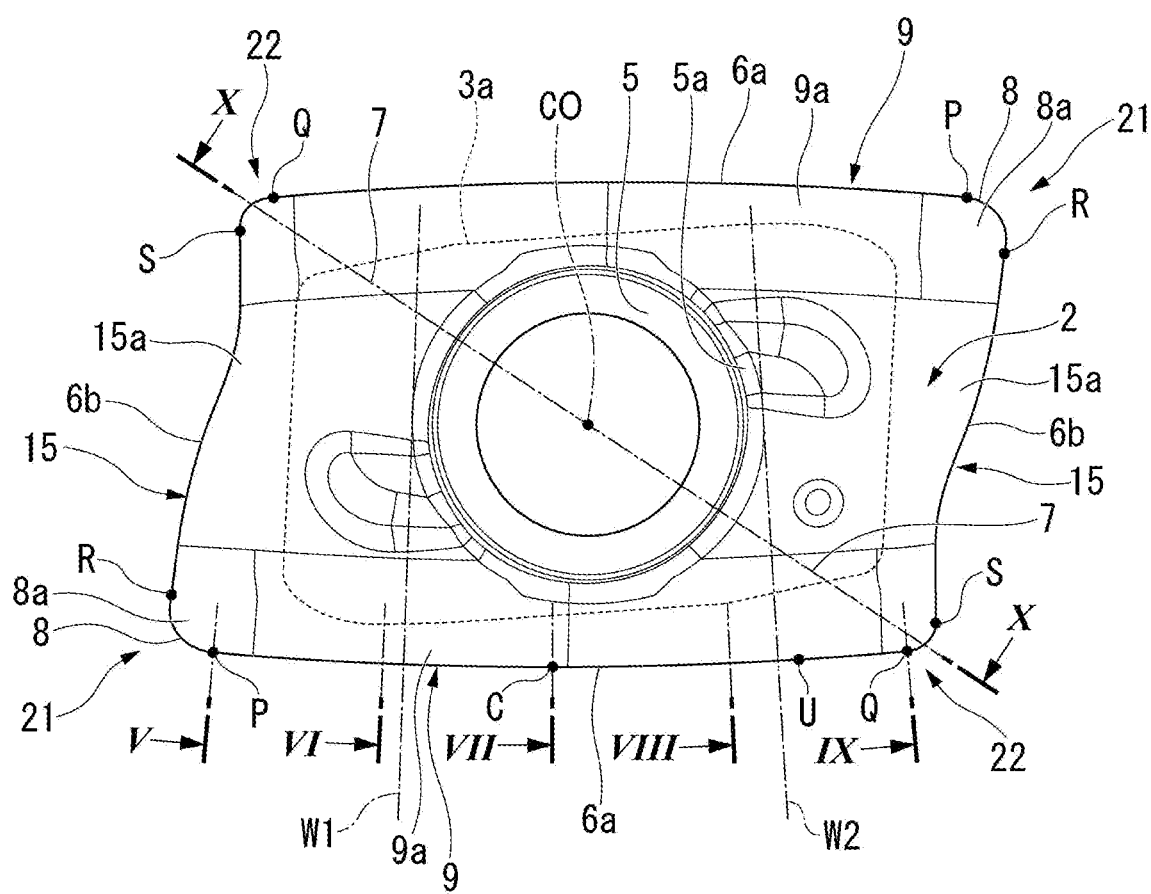
FIG. 2 is a plan view showing the cutting insert according to the embodiment.
Figure 3:
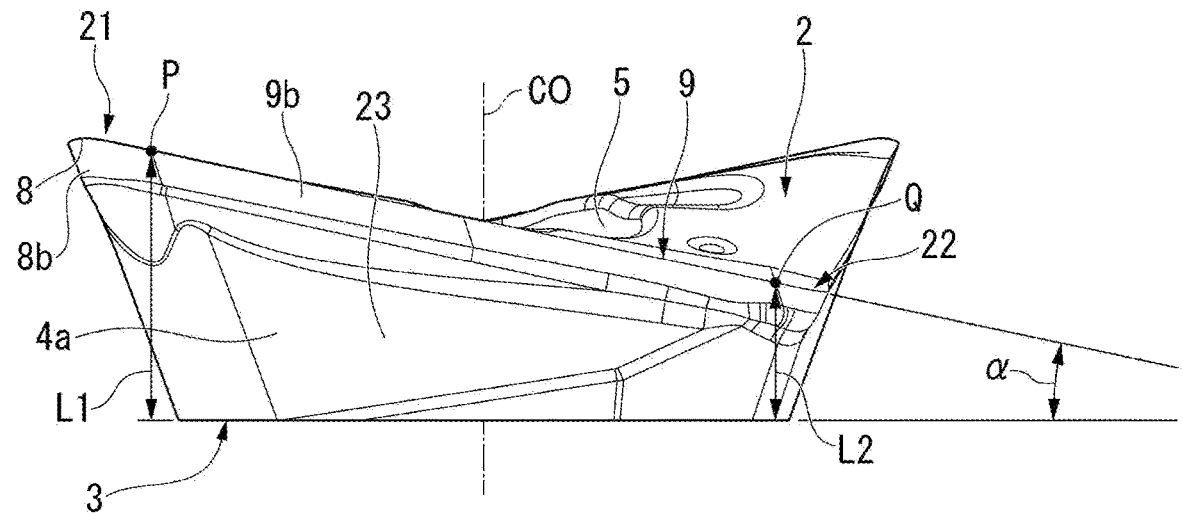
FIG. 3 is a side view when the cutting insert according to the embodiment is viewed from a side surface located on a long side of a main surface.
Figure 4:
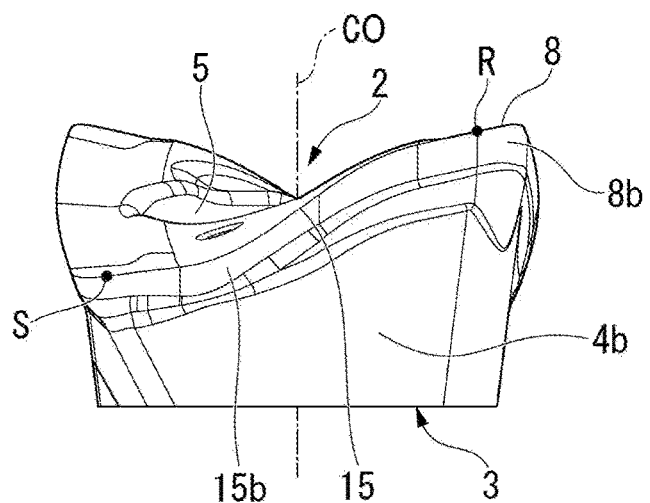
FIG. 4 is a side view when the cutting insert according to the embodiment is viewed from a side surface located on a short side of the main surface.

FIG. 1 is a perspective view showing an embodiment of a cutting insert (hereinafter, simply referred to as an insert) 1. FIG. 2 is a plan view showing a configuration of a main surface 2 located on an upper surface side of the insert 1 shown in FIG. 1. FIG. 3 is a side view showing a configuration of a first side surface portion 4a adjacent to a first side ridge portion 6a of the insert 1. FIG. 4 is a side view showing a configuration of a second side surface portion 4b adjacent to a second side ridge portion 6b of the insert 1.

For example, the insert 1 according to the present embodiment is formed of a hard material such as a cemented carbide alloy mainly having tungsten carbide and cobalt. The insert 1 has a flat parallelogram plate shape in a plan view. The insert 1 includes the main surface 2, a seating surface 3 facing a side opposite to the main surface 2, and a side surface 4 connecting the main surface 2 and the seating surface 3 to each other. The side surface 4 has a pair of first side surface portions 4a and a pair of second side surface portions 4b.

Figure 11:
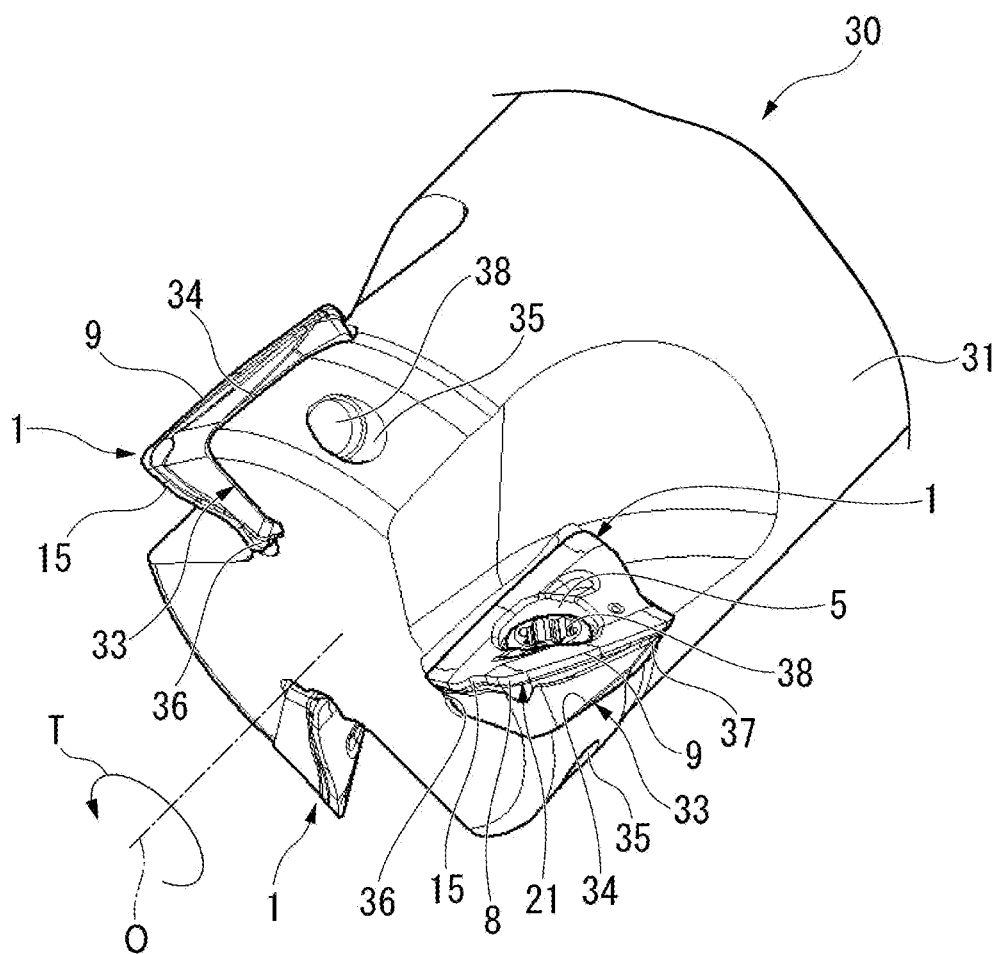
FIG. 11 is a perspective view of an indexable edge rotary cutting tool on which the cutting insert according to the embodiment is mounted.

As shown in FIG. 11 (to be described later), the insert 1 is detachably mounted on a tip portion of a tool main body 31 by using a clamp screw (fixing member) 38. The main surface 2 and the seating surface 3 has a mounting hole 5 into which a clamp screw 38 is inserted. The mounting hole 5 extends along a central axis CO. In the following description, a direction along the central axis CO will be simply referred to as an axial direction of the mounting hole 5, and a direction perpendicular to the central axis CO will be simply referred to as a radial direction of the mounting hole 5, in some cases.

As shown in FIG. 2, the main surface 2 is formed in a substantially parallelogram shape. The main surface 2 has four side ridge portions (a pair of first side ridge portions 6a and a pair of second side ridge portions 6b) located at a boundary with the side surface 4. The first side ridge portion 6a is located on a long side, and configures a boundary between the main surface 2 and the first side surface portion 4a. The second side ridge portion 6b is located on a short side, and configures a boundary between the main surface 2 and the second side surface portion 4b.

In four corner portions where the first side ridge portion 6a and the second side ridge portion 6b intersect each other, corner portions having an arc shape are formed at symmetrical positions via the mounting hole 5. The main surface 2 has a substantially parallelogram shape in a plan view. The four corner portions are classified into a pair of acute angle corner portions 21 and a pair of obtuse angle corner portions 22. That is, the main surface 2 has the pair of acute angle corner portions 21 and the pair of obtuse angle corner portions 22. In addition, the first side ridge portion 6a and the second side ridge portion 6b which are arranged each other across the acute angle corner portion 21 intersect each other at an acute angle, and the first side ridge portion 6a and the second side ridge portion 6b which are arranged each other across the obtuse angle corner portion 22 intersect each other at an obtuse angle.

The acute angle corner portion 21 has a corner cutting edge 8. Out of the first side ridge portion 6a and the second side ridge portion 6b which are arranged each other across the acute angle corner portion 21, a main cutting edge 9 is disposed in the first side ridge portion 6a, and a subsidiary cutting edge 15 is disposed in the second side ridge portion 6b.

As shown in FIG. 2, the corner cutting edge 8 has an arc shape. The main cutting edge 9 is connected to one end portion P of the corner cutting edge 8, and the subsidiary cutting edge 15 is connected to the other end portion R. The main cutting edge 9 extends along the first side ridge portion 6a from the end portion P connected to the corner cutting edge 8 in the acute angle corner portion 21 to an end portion Q located on the obtuse angle corner portion 22 side. The subsidiary cutting edge 15 extends along the second side ridge portion 6b from an end portion R connected to the corner cutting edge 8 in the acute angle corner portion 21 to an end portion S located on the obtuse angle corner portion 22 side.

In addition, the main surface 2 has rake faces 9a, 15a, and 8a corresponding to the main cutting edge 9, the subsidiary cutting edge 15, and the corner cutting edge 8. In addition, the side surface 4 has flank faces 9b, 15b, and 8b corresponding to the main cutting edge 9, the subsidiary cutting edge 15, and the corner cutting edge 8.

The seating surface 3 is a bottom portion of the insert 1, and has a planar shape. The seating surface 3 is perpendicular to the central axis CO. As shown in FIG. 11, when the insert 1 is mounted on an insert mounting seat 33 and the insert 1 is fixed by fastening the clamp screw 38, the seating surface 3 of the insert 1 closely adheres to a mounting surface 34 (refer to FIG. 11) of the insert mounting seat 33. As shown in FIG. 2, the seating surface 3 is formed in a substantially parallelogram shape, and is included inside a projection region in the axial direction of the main surface 2.

The insert 1 according to the present embodiment is formed in a shape having a type of 2 corners. Therefore, when the insert 1 is mounted on the insert mounting seat 33 and cutting work is carried out for a cutting workpiece by using the indexable edge rotary cutting tool to which the insert 1 is fixed, if any one of the main cutting edge 9, the subsidiary cutting edge 15, and the corner cutting edge 8 which are formed across one corner cutting edge 8 of the insert 1 used for the cutting work wears to reach a predetermined wear amount, the insert 1 is unfixed from the insert mounting seat, and is rotated as large as 180°. Thereafter, the insert 1 is mounted again so that the unused corner cutting edge 8, and the main cutting edge 9 and the subsidiary cutting edge 15 which are formed across the corner cutting edge 8 are used for the subsequent cutting work. In this manner, it is possible to lengthen one lifetime of the insert 1.

(Main Cutting Edge)

When the cutting work is carried out for the cutting workpiece by mounting the insert 1 on the insert mounting seat 33 of an indexable edge rotary cutting tool 30, mainly when engraving work is carried out for an alloy steel standing wall, particularly, a vertical wall surface, the main cutting edge 9 is used as the main cutting edge.

As shown in FIG. 2, the main cutting edge 9 is formed in an entire length of the first side ridge portion 6a between one end portion P of the corner cutting edge 8 and one end portion Q of the obtuse angle corner portions 22. The main cutting edge 9 is formed in an arc shape projecting in an outward direction of the insert 1 (outward in the radial direction with respect to the mounting hole 5) from the end portion P toward the end portion Q.

As shown in FIG. 3, the main cutting edge 9 is inclined at an inclination angle $\alpha$ so as to be closer to the seating surface 3 side as the main cutting edge 9 in a direction from the end portion P located on the acute angle corner portion 21 side toward the end portion Q located on the obtuse angle corner portion 22 side. The inclination angle $\alpha$ is an angle of the main cutting edge 9 with reference to a plane (seating surface 3 in the present embodiment) perpendicular to the axial direction of the mounting hole 5. It is preferable that the inclination angle $\alpha$ is set to be equal to or larger than 8°. Since the inclination angle $\alpha$ is set to be equal to or larger than 8°, it is possible to reduce cutting resistance applied to the main cutting edge 9 when the cutting work is carried out, and it is possible to limit a defect of the main cutting edge 9. In addition, for the same reason, it is more preferable that the inclination angle $\alpha$ is set to be equal to or larger than 10°. It is preferable that the inclination angle $\alpha$ is set to be equal to or smaller than 11.5°, and more preferable that the inclination angle $\alpha$ is set to be equal to or smaller than 15°. However, the configuration is not limited thereto.

A distance from the seating surface 3 along the axial direction of the mounting hole 5 in the end portion P on the acute angle corner portion 21 side of the main cutting edge 9 is set as L1. Similarly, a distance from the seating surface 3 along the axial direction of the mounting hole 5 in the end portion Q on the obtuse angle corner portion 22 side of the main cutting edge 9 is set as L2. In this case, the insert 1 according to the present embodiment satisfies a relationship of (Equation 1) and (Equation 2) below.

$$0.4 \leq L2/L1 \leq 0.7 \quad \text{(Equation 1)}$$

$$2.0 \text{ mm} \leq L2 \leq 3.9 \text{ mm} \quad \text{(Equation 2)}$$

Since the relationship of (Equation 1) is satisfied, the main cutting edge 9 can preferably ensure a sufficient inclination angle $\alpha$ (equal to or larger than 8°). In this manner, it is possible to reduce the cutting resistance applied to the main cutting edge 9 when the cutting work is carried out, and it is possible to limit the defect of the main cutting edge 9. On the other hand, in a case of L2/L1<0.4, a value of L2 tends to decrease compared to a value of L1. Accordingly, sufficient strength of the insert cannot be obtained. Consequently, there is a disadvantage in that the main cutting edge 9 has poor defect resistance. In a case of L2/L1>0.7, the cutting resistance increases, and it is difficult to set a proper value of the inclination angle $\alpha$. In addition, since the relationship of (Equation 2) is satisfied, the main cutting edge 9 ensures the rigidity in the thickness direction, and can preferably limit damage to the insert 1 when the cutting work is carried out using the main cutting edge 9. On the other hand, in a case of L2<2.0 mm, it is difficult to ensure the sufficient rigidity in the thickness direction of the insert. In a case of L2>3.9 mm, the cutting resistance increases, and it is difficult to set the proper value of the inclination angle $\alpha$. It is more preferable that (Equation 1) is expressed by 0.50 L2/L1≤0.55, and it is more preferable that (Equation 2) is expressed by 2.5 mm≤L2≤3.0 mm. However, the configuration is not limited thereto.

FIGS. 5, 6, 7, 8, and 9 are respectively sectional views taken along lines V, VI, VII, VIII, and IX in FIG. 2. Line V passes through the end portion P on the acute angle corner portion 21 side of the main cutting edge 9, and line IX passes through the end portion Q on the obtuse angle corner portion 22 side of the main cutting edge 9. Line VII passes through a center point C located at the center in the longitudinal direction of the main cutting edge 9. Line VI is located between line V and line VII, and line VIII is located between line VII and line IX. In addition, lines V, VI, VII, VIII, and IX are straight lines perpendicular to the main cutting edge 9 at the respective positions.

As shown in FIGS. 5 to 9, the rake face 9a of the main cutting edge 9 is disposed on the main surface 2 side across the main cutting edge 9, and the flank face 9b of the main cutting edge 9 is disposed on the side surface 4 side. Here, a plane perpendicular to the central axis CO of the mounting hole 5 and passing through the main cutting edge 9 is set as a first plane HP, and an imaginary plane perpendicularly intersecting the first plane HP on a main cutting edge ridge line is set as a second plane VP. In this case, the rake face 9a is inclined at a rake angle $\beta$ with respect to the first plane HP. In addition, the flank face 9b is inclined at a clearance angle $\gamma$ with respect to the second plane VP.

In general, the rake angle $\beta$ is set as a positive angle in a case of being inclined in a downward direction as the rake face 9a is oriented inward from the main cutting edge 9 with respect to the first plane HP, and is set as a negative angle in a case of being inclined in an upward direction. More precisely, the rake angle $\beta$ is set as the positive angle in a case where the rake face 9a is inclined so as to be closer to the seating surface 3 side as the rake face 9a is oriented inward. Conversely, the rake angle is set as the negative angle in a case where the rake face 9a projects to a side bulging to the seating surface 3.

Figure 5:
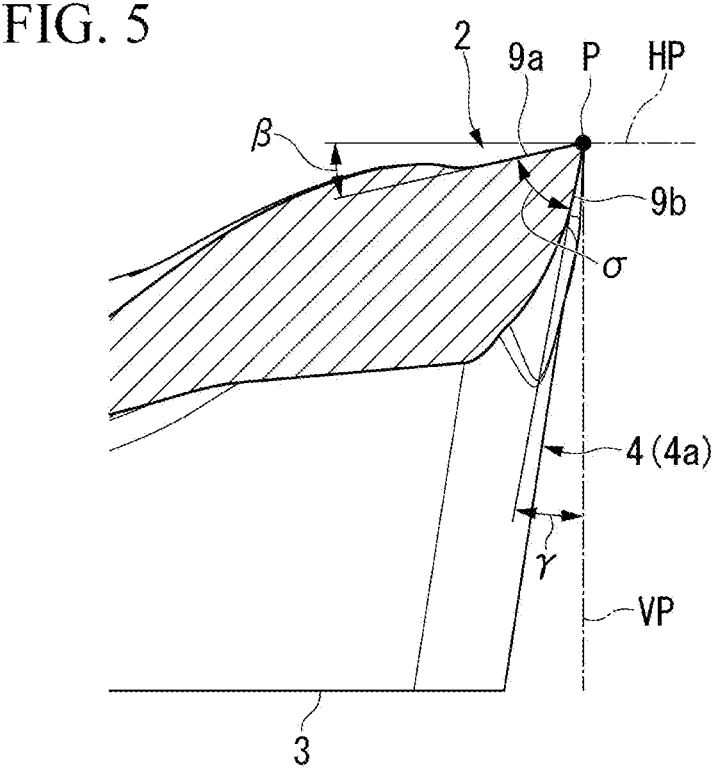
FIG. 5 is a sectional view taken along line V in FIG. 2.
Figure 6:
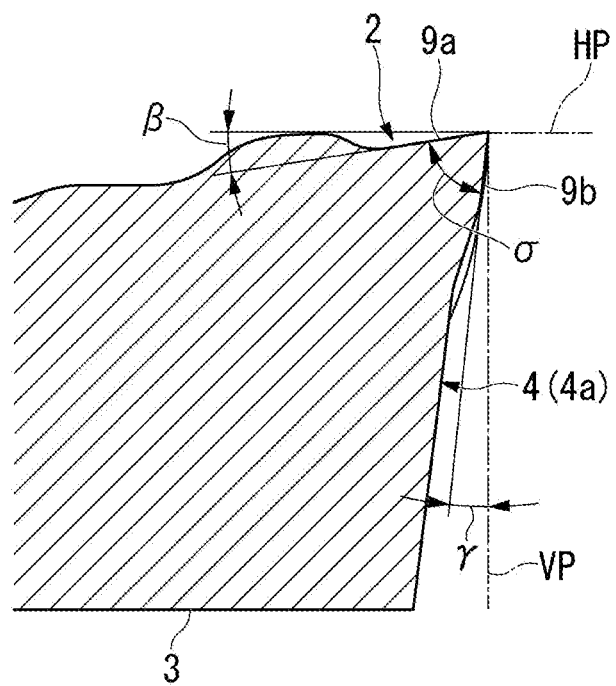
FIG. 6 is a sectional view taken along line VI in FIG. 2.
Figure 7:
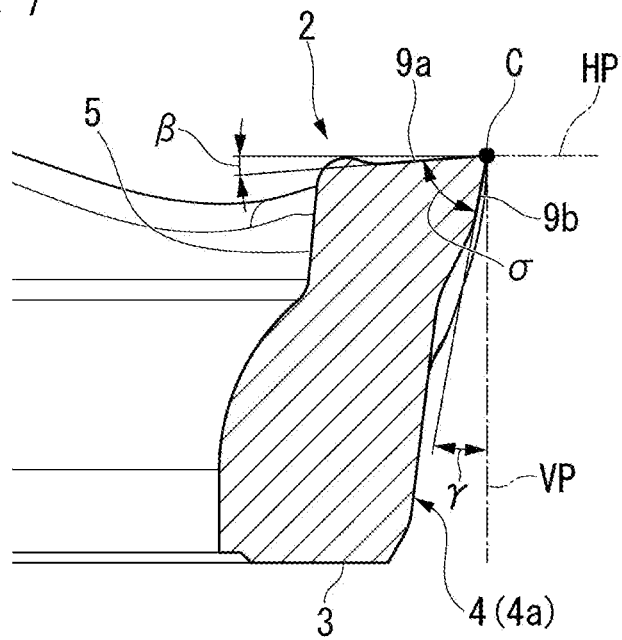
FIG. 7 is a sectional view taken along line VII in FIG. 2.
Figure 8:
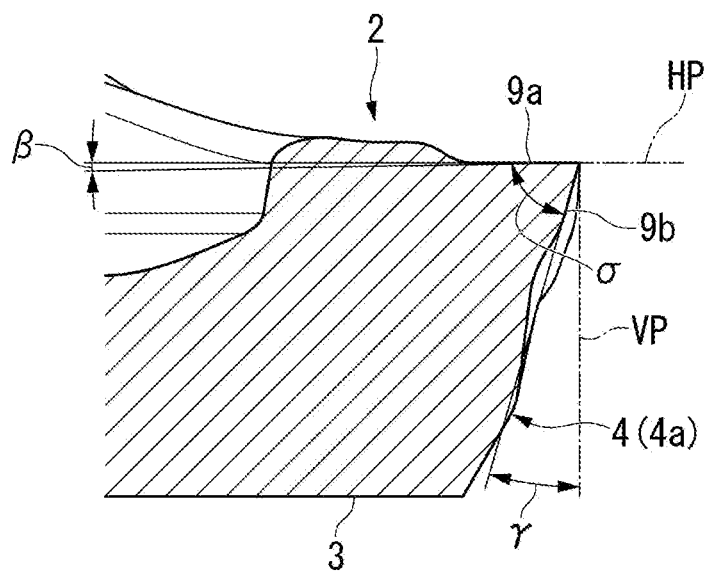
FIG. 8 is a sectional view taken along line VIII in FIG. 2.
Figure 9:
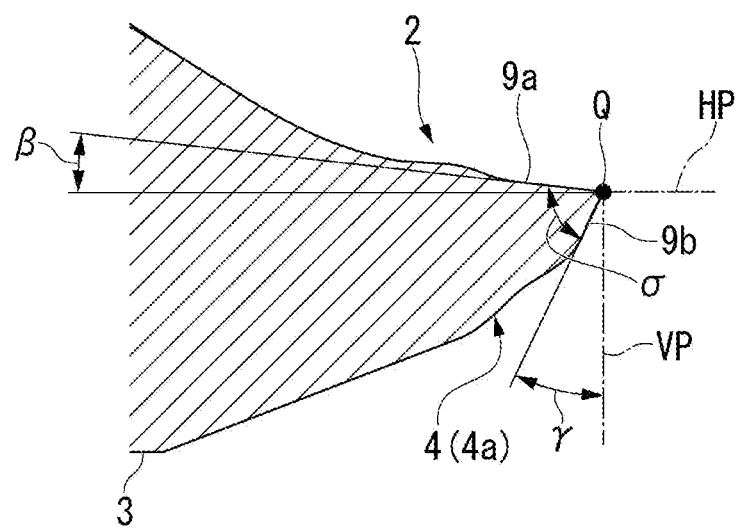
FIG. 9 is a sectional view taken along line IX in FIG. 2.

As shown in FIG. 5, the rake angle $\beta$ of the rake face 9a is inclined to the positive angle side in the end portion P on the acute angle corner portion 21 side of the main cutting edge 9. In addition, as shown in FIGS. 5 to 9, the rake angle $\beta$ is gradually larger to the negative angle side in a direction from the end portion P on the acute angle corner portion 21 side of the main cutting edge 9 toward the end portion R on the obtuse angle corner portion 22 side. As shown in FIGS. 5 to 9, an absolute value of the rake angle $\beta$ decreases from the end portion P of the main cutting edge 9 toward the end portion Q, and the rake face 9a is located above the first plane HP between line VIII and line IX. Therefore, as shown in FIG. 9, the rake angle $\beta$ of the rake face 9a is inclined to the negative angle side in the end portion Q on the acute angle corner portion 21 side of the main cutting edge 9.

In the present embodiment, in the acute angle corner portion 21, the main cutting edge 9 is located on the most tip side in the axial direction of the indexable edge rotary cutting tool (hereinafter, simply referred to as a "tool") 30 (refer to FIG. 11). Therefore, chattering is likely to occur in the main cutting edge 9 in the vicinity of the acute angle corner portion 21. In general, in a case of being inclined to the positive angle side, the rake angle β can improve cutting quality of the main cutting edge 9. In a case of being inclined to the negative angle side, the rake angle β can improve the strength of the cutting edge of the main cutting edge 9.

According to the present embodiment, the rake angle β is inclined to the most positive angle side in the end portion P in the vicinity of the acute angle corner portion 21 of the main cutting edge 9. In this manner, the cutting quality is improved on the tip side of the tool 30, and the chattering is limited when the cutting work is carried out. Therefore, a mistake or a defect of the main cutting edge 9 can be limited.

In addition, the rake angle β is inclined to the most negative angle side in the end portion Q in the vicinity of the obtuse angle corner portion 22 of the main cutting edge 9. In this manner, the rigidity is improved on the base end side of the tool 30, and the chattering is limited. Therefore, even in a case where the chattering occurs, the defect of the main cutting edge 9 can be limited.

The insert 1 according to the present embodiment has a corner angle of approximately 90°. Accordingly, an operation range of the main cutting edge 9 depends on a machining condition. The machining efficiency can be improved by setting the large cutting amount. In this case, the operation range of the main cutting edge 9 operated for the cutting is up to the obtuse angle corner portion 22 from the corner cutting edge 8 toward the base end side in the axial direction of the tool 30. As the main cutting edge 9 is closer to the seating surface 3 as the main cutting edge 9 is closer to the obtuse angle corner portion 22 side from the acute angle corner portion 21 side. Accordingly, the insert 1 becomes thinner in the vicinity of the obtuse angle corner portion 22. In this manner, the insert 1 is likely to crack in the vicinity of the obtuse angle corner portion 22. According to the present embodiment, the main cutting edge 9 is inclined to the negative angle side. Therefore, it is possible to increase the strength of the insert 1 by ensuring the thickness of the insert 1 in the obtuse angle corner portion 22.

According to the present embodiment, the rake angle β becomes gradually larger to the negative angle side as the main cutting edge 9 is oriented from the acute angle corner portion 21 side to the obtuse angle corner portion 22 side. In this manner, while the sharp cutting quality is provided for to the main cutting edge 9 on the acute angle corner portion 21 side, the cutting edge strength of the main cutting edge 9 on the obtuse angle corner portion 22 side is ensured. Therefore, it is possible to prevent the defect.

As shown in FIG. 2, a point where the rake angle of the main cutting edge 9 is changed from the inclination to the positive angle side to the inclination to the negative angle side is set as a change point U. The change point U is located between line VIII and line X. The rake angle β of the main cutting edge 9 at the change point U is 0°. In the present embodiment, the change point U is located closer to the obtuse angle corner portion 22 in the longitudinal direction of the main cutting edge 9. Since the change point U is located as described above, a balanced relationship between the cutting quality and the cutting edge strength of the main cutting edge 9 can be properly maintained.

As shown in FIG. 2, out of a pair of surfaces W1 and W2 perpendicular to the main cutting edge 9 and including a tangent line of the edge portion 5a of the mounting hole 5 on the main surface 2, one surface located on the obtuse angle corner portion 22 side in the longitudinal direction of the main cutting edge 9 is set as a reference surface W2. It is preferable that the change point U is located on the obtuse angle corner portion 22 side from the reference surface W2. The wall thickness of the insert 1 along the axial direction of the mounting hole 5 becomes thinner toward the obtuse angle corner portion 22 along the longitudinal direction of the main cutting edge 9. On the other hand, the wall thickness along the radial direction of the mounting hole 5 becomes thinnest between the pair of surfaces W1 and W2 around a center point C in the longitudinal direction of the main cutting edge 9. Since the change point U is located on the obtuse angle corner portion 22 side from the reference surface W2, a portion to become thinner is located in a balanced manner. Therefore, it is possible to provide the insert 1 which is less likely to crack as a whole.

As shown in FIGS. 5 to 9, the clearance angle γ becomes larger as the main cutting edge 9 is oriented from the end portion P on the acute angle corner portion 21 side to the end portion Q on the obtuse angle corner portion 22 side of the main cutting edge 9. Since the clearance angle γ of the main cutting edge 9 becomes larger on the second end portion side, it is possible to more reliably limit a contact between the flank face 9b and the cutting workpiece on the most base end side in the axial direction of the tool 30.

More preferable specific examples of the rake angle β and the clearance angle γ of the main cutting edge 9 and further a wedge angle σ of the main cutting edge 9 will be described below. As shown in FIGS. 5 to 9, the wedge angle σ of the main cutting 9 edge is expressed by the wedge angle σ=90°−(rake angle β+clearance angle γ).

The rake angle β of the main cutting edge 9 becomes gradually larger to the negative angle side as the main cutting edge 9 is oriented from the acute angle corner portion 21 side to the obtuse angle corner portion 22 side. It is preferable that a change amount F of the rake angle β from the end portion P on the acute angle corner portion 21 side of the main cutting edge 9 toward the end portion R on the obtuse angle corner portion 22 side of the main cutting edge 9 is −1.30°/mm≤F≤−0.8°/mm throughout the total length of the main cutting edge 9. In this case, when the insert 1 is mounted on the tool 30, the value of the rake angle can be substantially constant. Accordingly, it is preferable in terms of ensuring the strength of the cutting edge. However, the present invention is not limited thereto.

The clearance angle γ of the main cutting edge 9 becomes larger as the main cutting edge 9 is oriented from the acute angle corner portion 21 side to the obtuse angle corner portion 22 side. It is preferable that a change amount G of the clearance angle γ from the end portion P on the acute angle corner portion 21 side of the main cutting edge 9 toward the end portion R on the obtuse angle corner portion 22 side of the main cutting edge 9 is 1.0°/mm≤F≤1.5°/mm throughout the total length of the main cutting edge 9. In this case, it is preferable in terms of more reliably limiting the contact between the flank face 9b and the cutting workpiece on the most base end side in the axial direction of the tool 30. However, the present invention is not limited thereto.

It is preferable that the wedge angle σ of the main cutting edge 9 is substantially constant from the acute angle corner portion 21 side to the obtuse angle corner portion 22 side. The wedge angle σ according to the present embodiment is preferably 72°±5°, more preferably 72°±4°, and further more preferably 72°±3.5° throughout the entire length of the main cutting edge 9. In this case, while the cutting resistance is reduced, the cutting edge strength can be ensured. However, the present invention is not limited thereto.

Figure 13:
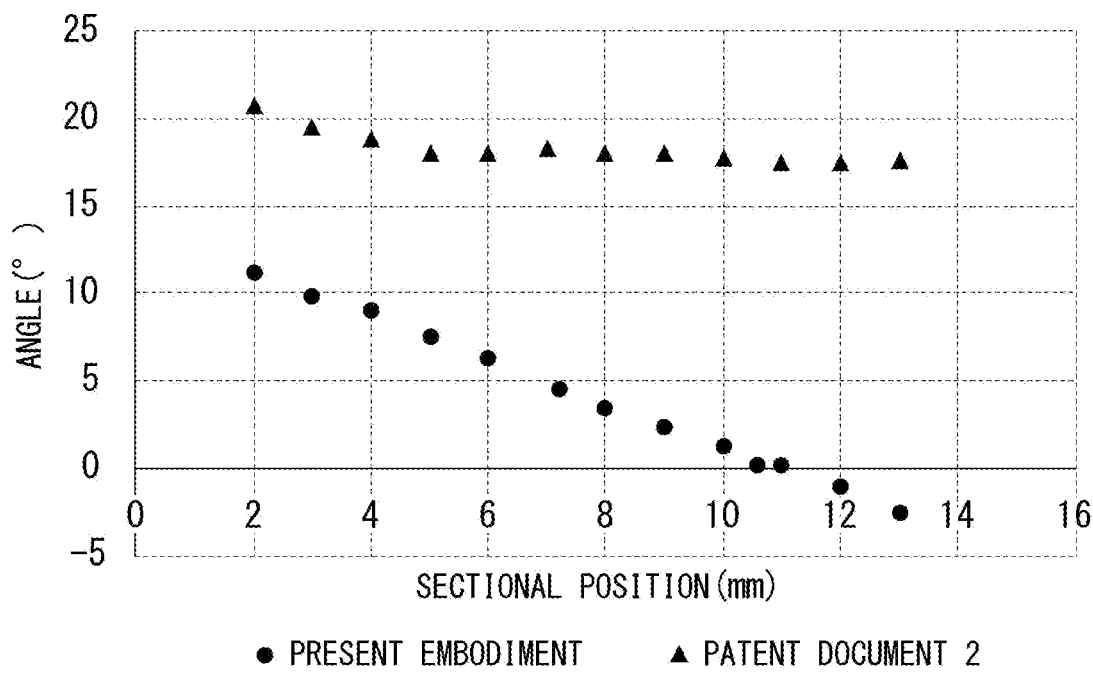
FIG. 13 is a graph showing a relationship between a distance (sectional position) from a tip on an acute angle corner portion of a cutting edge and a rake angle.
Figure 14:
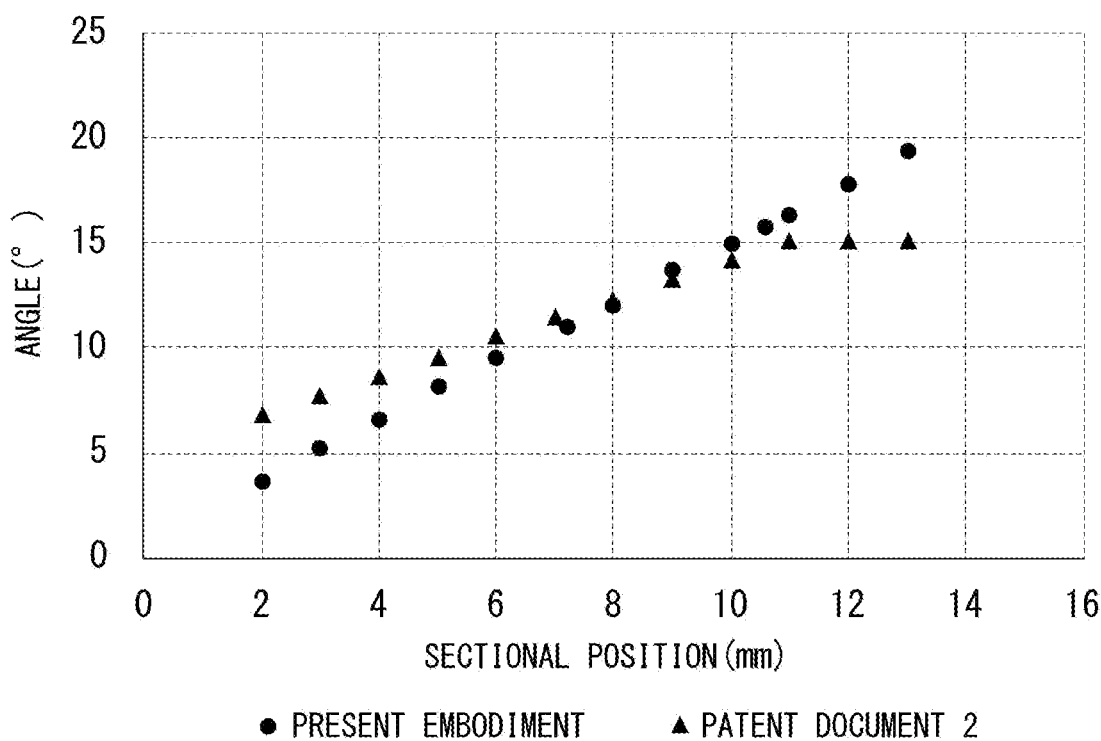
FIG. 14 is a graph showing a relationship between the distance (sectional position) from the tip on the acute angle corner portion of the cutting edge and a clearance angle.
Figure 15:
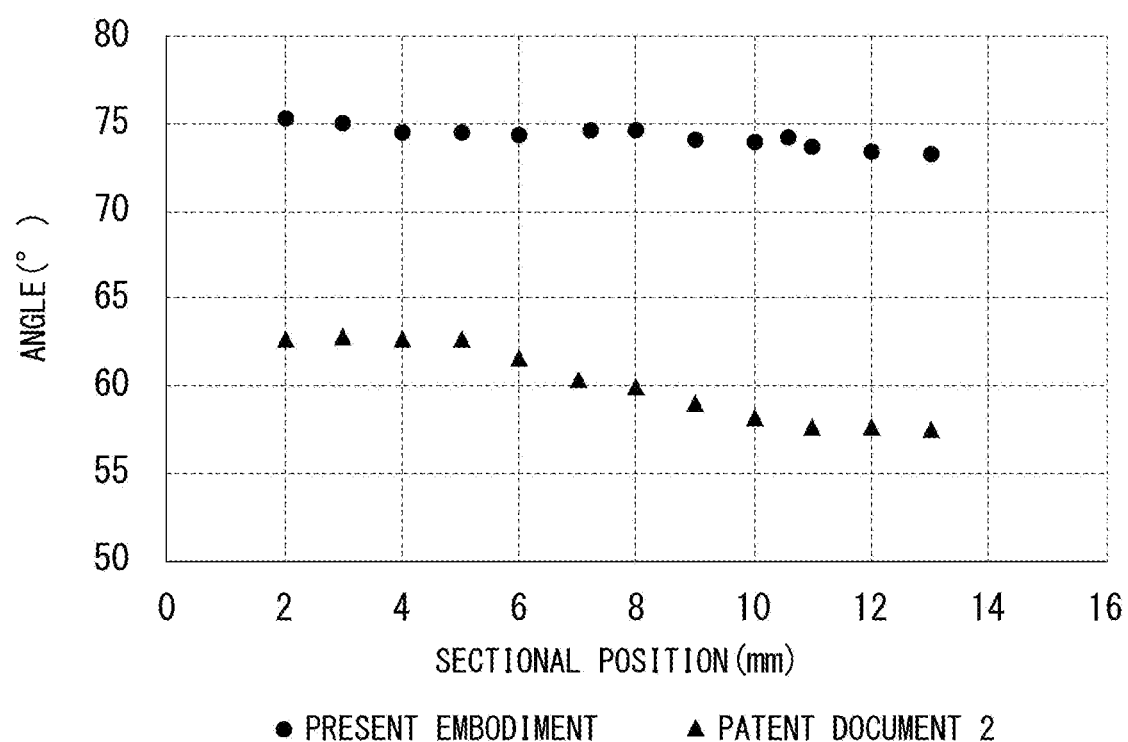
FIG. 15 is a graph showing a relationship between the distance (sectional position) from the tip on the acute angle corner portion of the cutting edge and a wedge angle.

Hereinafter, referring to FIGS. 13 to 15, an example of the rake angle (3, the clearance angle γ, and the wedge angle σ according to the present embodiment will be described in comparison with the rake angle, the clearance angle, and the wedge angle of the insert disclosed in Patent Document 2. In FIGS. 13-15, a circle plot indicates an example of the present embodiment and a triangular plot indicates the insert disclosed in Patent Document 2.

FIG. 13 shows an example of a relationship between a distance from the tip on the acute angle corner portion 21 side along the long side direction of the insert 1 and the rake angle β. Referring to FIG. 13, in Patent Document 2, the rake angle of the cutting edge has a constant value. Therefore, when the insert is mounted on the tool, the rake angle becomes larger on the obtuse angle corner portion side, and the cutting edge strength is weakened. On the other hand, the rake angle β of the main cutting edge 9 as an example according to the present embodiment becomes gradually larger to the negative angle side as the main cutting edge 9 is away from the tip on the acute angle corner portion 21 side along the long side direction of the insert 1. Therefore, when the insert 1 is mounted on the tool 30, the value of the rake angle can be substantially constant, and the strength of the cutting edge can be ensured. The change amount F of the rake angle β of the main cutting edge 9 in an example according to the present embodiment in FIG. 13 is approximately −1.24°/mm.

HG 14 shows an example of a relationship between the distance from the tip on the acute angle corner portion 21 side along the long side direction of the insert 1 and the clearance angle γ. In Patent Document 2, the clearance angle becomes larger away from the tip on the acute angle corner portion side along the long side direction of the insert. If the cutting edge is away from the tip approximately as much as 11 mm, the clearance angle shows a constant value. In the insert disclosed in Patent Document 2, the flank face having two stage faces such as an upper stage flank face and a lower stage flank face are provided up to a position away from the tip approximately as much as 11 mm away from the tip. The insert is formed so that the upper stage flank face is not present at the position away from the tip approximately as much as 11 mm. At the position where the upper stage flank face is not present, the flank face (restriction face) and the cutting edge ridge line are formed on the same plane, and the clearance angle is constant. Therefore, according to Patent Document 2, it is not possible to increase the clearance angle, and it is difficult to prevent the contact with the cutting workpiece.

On the other hand, the clearance angle γ of the main cutting edge 9 in an example according to the present embodiment becomes larger as the cutting edge is away from the tip on the acute angle corner portion 21 side along the long side direction of the insert 1. Therefore, it is possible to more reliably limit the contact between the flank face 9b and the cutting workpiece on the most base end side in the axial direction of the tool 30. The change amount G of the clearance angle γ of the main cutting edge 9 in an example according to the present embodiment in FIG. 14 is approximately 1.42°/mm.

FIG. 15 shows an example of a relationship between the distance from the tip on the acute angle corner portion 21 side along the long side direction of the insert 1 and the wedge angle σ. Referring to FIG. 15, in Patent Document 2, the wedge angle becomes smaller as the cutting edge is away from the tip on the acute angle corner portion 21 side along the long side direction of the insert 1. Therefore, in Patent Document 2, the wedge angle becomes smaller on the obtuse angle corner portion side where the insert is thin, and the cutting edge strength is insufficient. On the other hand, in an example according to the present embodiment, the wedge angle σ of the main cutting edge 9 is substantially constant from the acute angle corner portion 21 side to the obtuse angle corner portion 22 side. Therefore, the cutting edge strength can be ensured.

(Subsidiary Cutting Edge)

When the insert 1 is mounted on the insert mounting seat 33 of the tool 30 and the cutting work is carried out for the cutting workpiece (refer to FIG. 11), the subsidiary cutting edge 15 carries out the cutting work for the bottom surface portion of the cutting workpiece. The subsidiary cutting edge 15 is used as a flat drag for finishing work of the cutting workpiece or as a ramping blade for ramping work.

As shown in FIG. 2, the subsidiary cutting edge 15 is formed throughout the entire length of the second side ridge portion 6b from the other end portions R of the corner cutting edge 8 to the other end portion S of the obtuse angle corner portion 22. The subsidiary cutting edge 15 is formed to be curved so that the end portion R side projects outward in a planar view (state when viewed in the axial direction of the mounting hole 5). In addition, as shown in FIG. 4, the subsidiary cutting edge 15 is formed to be curved so that the end portion R side projects upward in a side view (state when viewed in the direction perpendicular to the axial direction of the mounting hole and directly facing the subsidiary cutting edge 15).

(Main Surface)

Next, a configuration of the main surface 2 of the insert 1 will be described in detail.

As shown in FIG. 2, the main surface 2 has the rake face 9a of the main cutting edge 9 in a portion adjacent to the main cutting edge 9, has the rake face 8a of the corner cutting edge 8 in a portion adjacent to the corner cutting edge 8, and has the rake face 15a of the subsidiary cutting edge 15 in a portion adjacent to the subsidiary cutting edge 15.

Figure 10:
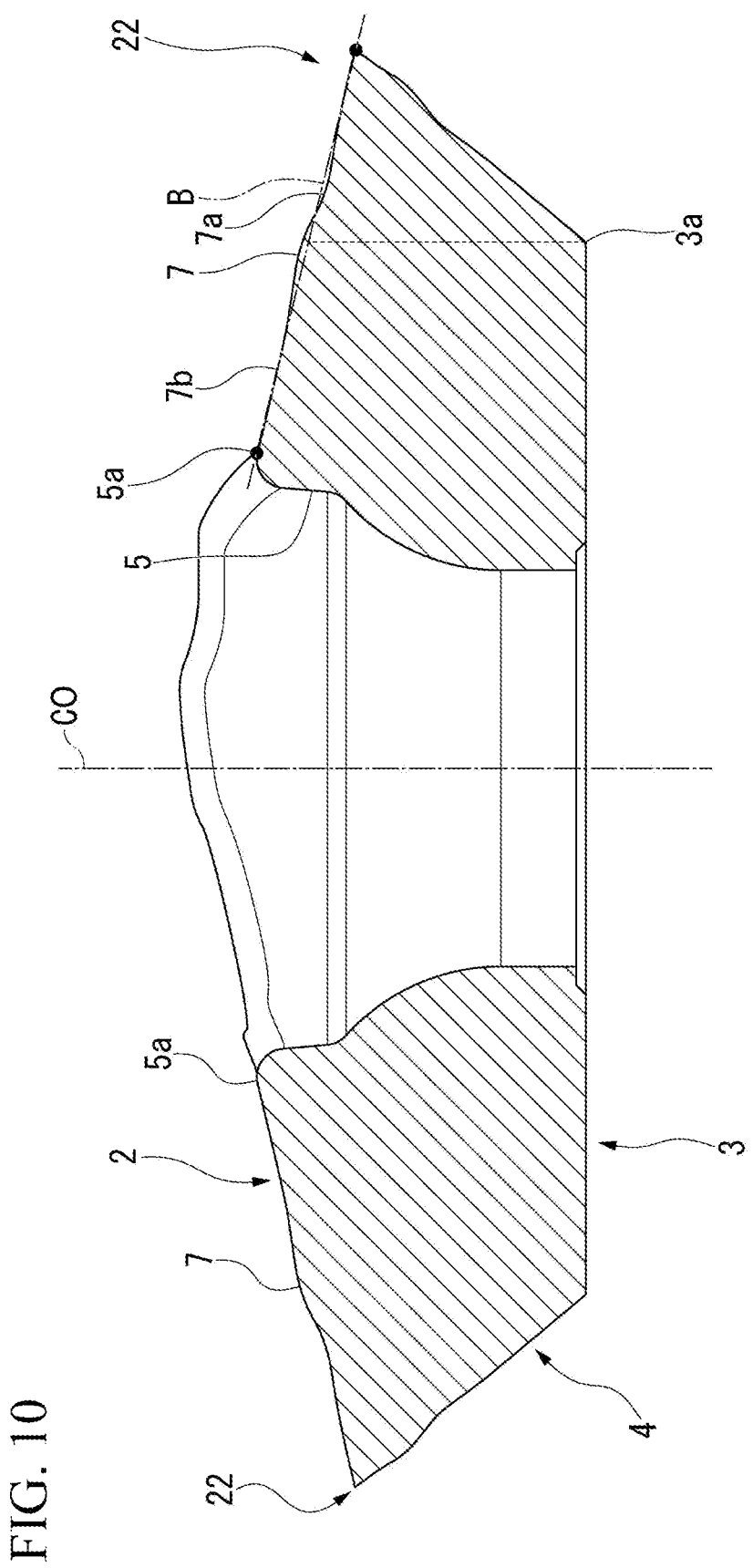
FIG. 10 is a sectional view taken along line X-X in FIG. 2.

FIG. 10 is a sectional view taken along line X-X in FIG. 2. Line X-X is a straight line connecting the pair of obtuse angle corner portions 22 of the main surface 2 to each other. As shown in FIG. 10, the main surface 2 is inclined in a direction away from the seating surface 3 as the main surface 2 is oriented from the obtuse angle corner portion 22 toward the edge portion 5a of the mounting hole 5 along a diagonal line (line X-X in FIG. 2) connecting the pair of obtuse angle corner portions 22 to each other. That is, in a state shown in FIG. 10, the main surface 2 always ascends from the obtuse angle corner portion 22 toward the edge portion 5a along the diagonal line, and there is neither horizontal location nor descending location.

According to the present embodiment, it is possible to limit crack occurrence in the insert 1.

The insert 1 receives the strongest cutting force in the corner cutting edge 8 when the cutting work is carried out for the cutting workpiece by using the tool 30 mounted on and fixed to the insert mounting seat 33. Therefore, the insert 1 during the cutting work receives the bending stress increasing along the diagonal line (line X-X in FIG. 2) connecting the pair of obtuse angle corner portions 22 to each other. In addition, the insert 1 becomes thinner in the vicinity of the pair of obtuse angle corner portions 22. Therefore, a general two corner-type cutting insert is likely to crack along the diagonal line.

In contrast, the insert 1 according to the present embodiment has a structure whose thickness in the axial direction (distance between the main surface 2 and the seating surface 3 in the axial direction) always increases from the obtuse angle corner portion 22 toward the edge portion 5a of the mounting hole 5 in the direction along the diagonal lines. In this manner, it is possible to improve the strength of the insert 1 along the diagonal line connecting the pair of obtuse angle corner portions 22 to each other, and it is possible to limit the crack occurrence along the diagonal line.

If the main surface 2 partially has a region inclined in the direction away from the seating surface 3 as the main surface 2 is oriented from the obtuse angle corner portion 22 toward the edge portion 5a of the mounting hole 5 along the diagonal line (line X-X), the above-described advantageous effect can be achieved.

In a cross section shown in FIG. 10, the main surface 2 has a projection portion 7 projecting upward from a straight line B connecting the obtuse angle corner portion 22 and the edge portion 5a of the mounting hole 5 to each other. A foot portion 7a of the projection portion 7 on the obtuse angle corner portion 22 side and a foot portion 7b on the mounting hole 5 side are located on a lower side (on the seating surface 3 side) from the straight line B. Since the projection portion 7 is provided, the strength of the insert 1 along the diagonal line connecting the pair of obtuse angle corner portions 22 can be further improved.

As shown in FIGS. 2 and 10, when viewed in the axial direction of the mounting hole 5, it is preferable that the projection portion 7 overlaps the side ridge portion 3a of the seating surface 3 or is located inside the side ridge portion 3a. The insert 1 receives a reaction force from the mounting surface 34 of the tool 30 at the seating surface 3 if the insert 1 receives a cutting force from the cutting workpiece during the cutting work. Therefore, when viewed in the axial direction of the mounting hole 5, greater stress is applied to the insert 1 inside the side ridge portion 3a of the seating surface 3. When the projection portion 7 is viewed in the axial direction of the mounting hole 5, the projection portion 7 is located inside the side ridge portion 3a. In this manner, the region to which the greater stress is applied can be thickened using the projection portion 7. Therefore, it is possible to more effectively limit the crack occurrence of the insert 1.

Line X-X in FIG. 2 is a line drawn using the following method. That is, in a plan view, a virtual circle in contact with the pair of obtuse angle corner portions 22 around the central axis CO is drawn, and a straight line connecting the virtual circle and a contact point of the pair of obtuse angle corner portion 22 to each other is line X-X. In the present specification, the diagonal line connecting the pair of obtuse angle corner portions 22 of the main surface 2 to each other is set as a line drawn using a method which is the same as that of line X-X described above.

(Side Surface)

Next, a configuration of the side surface 4 of the insert 1 will be described in more detail.

The first side surface portion 4a of the side surface 4 is adjacent to the first side ridge portion 6a. As shown in FIG. 3, the first side surface portion 4a has a restriction surface portion 23 and the flank face 9b of the main cutting edge 9. When the insert 1 is mounted on and fixed to the insert mounting seat 33 of the tool 30, the restriction surface portion 23 is a side surface portion which firmly and closely adheres to a long side restriction wall surface 36 (refer to FIG. 11) disposed in the insert mounting seat 33 so as to and prevent rotation of the insert 1 during the cutting work. The restriction surface portion 23 has a planar shape.

The second side surface portion of the side surface 4 is adjacent to the second side ridge portion 6b. As shown in FIG. 4, the second side surface portion 4b has the flank face 15b of the subsidiary cutting edge 15. When the insert 1 is mounted on and fixed to the insert mounting seat 33 of the tool 30, the second side surface portion 4b is a side surface (restriction surface) which firmly and closely adheres to a short side restriction wall surface 37 (refer to FIG. 11) disposed in the insert mounting seat 33 so as to prevent the rotation of the insert 1 during the cutting work.

As shown in FIGS. 3 and 4, the first side surface portion 4a and the second side surface portion 4b of the side surface 4 has the flank face 8b disposed below the corner cutting edge 8.

(Configuration of Indexable Rotary Cutting Tool (Replaceable Cutting Edge Rotary Cutting Tool))

Figure 12:
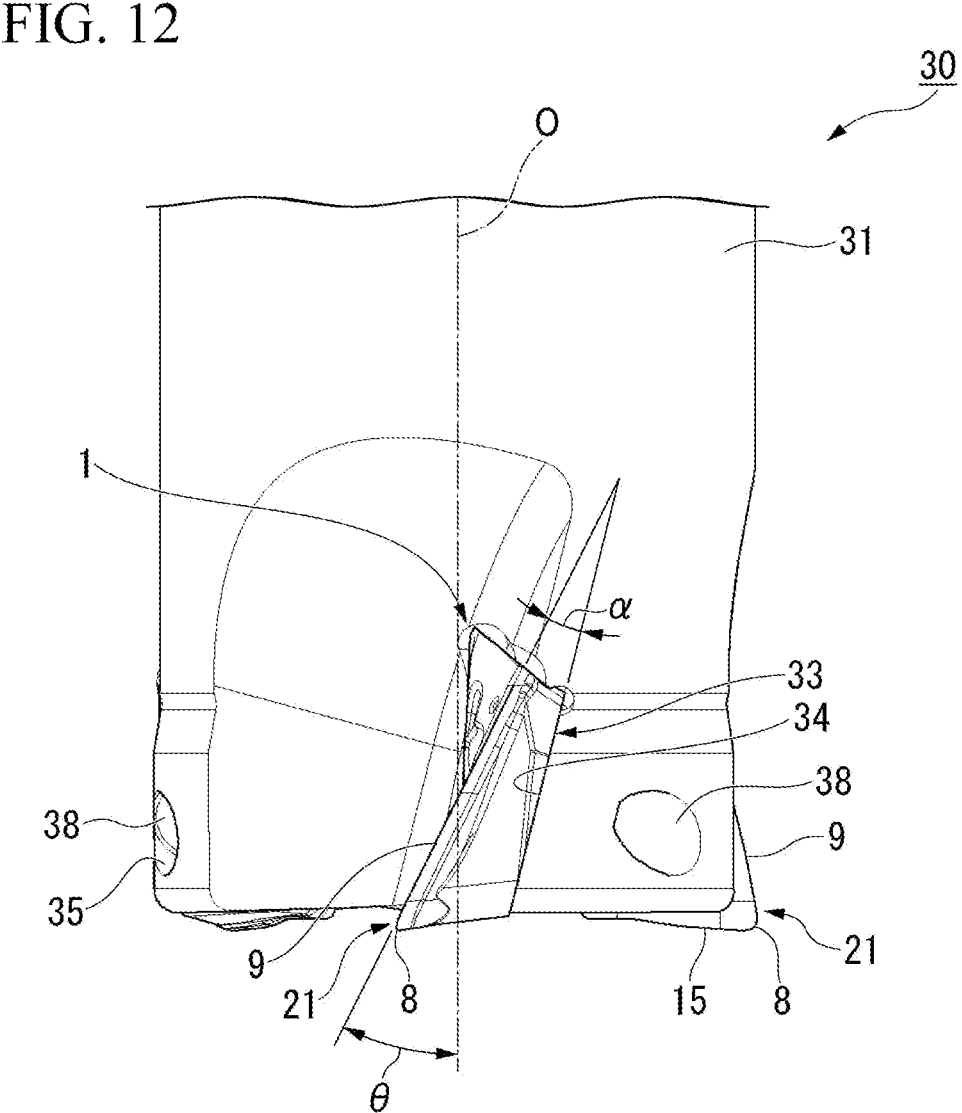
FIG. 12 is a side view of the indexable edge rotary cutting tool on which the cutting insert according to the embodiment is mounted.

FIG. 11 is a perspective view of the tool 30 on which the insert 1 is mounted, and FIG. 12 is a side view.

The tool 30 carries out milling work by rotating the tool main body 31 in a rotation direction T around a rotation axis O. The tool 30 has the tool main body 31 and three inserts 1. The tip portion of the tool main body 31 has three insert mounting seats 33. The insert mounting seat 33 includes a mounting surface 34, a screw hole 35 formed on the mounting surface 34, the long side restriction wall surface 36, and the short side restriction wall surface 37.

When the insert 1 is mounted on and fixed to the insert mounting seat 33 by fastening the clamp screw 38, the mounting surface 34 formed in the insert mounting seat 33 serves as a planar surface which closely adheres to the seating surface 3 of the insert 1. When the insert 1 is fixed to the insert mounting seat 33, the screw hole 35 serves as a screw hole for screw fitting with a screw portion of the clamp screw 38 inserted into the mounting hole 5 of the insert 1.

When the insert 1 is mounted on and fixed to the insert mounting seat 33, the long side restriction wall surface 36 serves as a wall surface for closely adhering to the restriction surface portion 23 formed on the first side surface portion 4a adjacent to the first side ridge portion 6a of the insert 1. Similarly, when the insert 1 is mounted on and fixed to the insert mounting seat 33, the short side restriction wall surface 37 serves as a wall surface for closely adhering to the second side surface portion 4b adjacent to the second side ridge portion 6b of the insert 1.

In the tool 30 according to the present embodiment, when the insert 1 is mounted on and fixed to the insert mounting seat 33, the main cutting edge 9 of the insert 1 is located on the outer peripheral side of the tool main body 31, the subsidiary cutting edge 15 is located on the tip surface side of the tip portion of the tool main body 31.

As shown in FIG. 12, the rake angle $\theta$ in the axial direction of the main cutting edge 9 of the insert 1 is equal to or larger than 15°. The rake angle $\theta$ in the axial direction of the main cutting edge 9 is an angle formed between a surface through which the whole rotation axis O and a portion of the main cutting edge 9 pass and the main cutting edge 9. The rake angle $\theta$ in the axial direction O is an angle represented by the sum of the angle of the mounting surface 34 with respect to the rotation axis O and the inclination angle $\alpha$ of the main cutting edge 9 with reference to the seating surface 3. Since the rake angle $\theta$ in the axial direction of the main cutting edge 9 is set to be equal to or larger than 15° in the tool 30, the cutting resistance applied to the main cutting edge 9 can be reduced during the cutting work, and the defect of the cutting edge 9 can be limited.

Hitherto, the embodiment according to the present invention has been described. However, the configurations and the combination in the embodiment are merely examples. Additions, omissions, substitutions, and other modifications in the configuration are available within the scope not departing from the gist of the present invention. In addition, the present invention is not limited by the embodiment.

For example, in the above-described embodiment, a case has been described in which the three inserts 1 are mounted on the tool 30 at equal angles around the rotation axis O. However, the number of the inserts 1 is not limited to three.

INDUSTRIAL APPLICABILITY

According to the present invention, it is possible to provide a cutting insert which reduces cutting resistance of a cutting edge and which is less likely to crack, and an indexable edge rotary cutting tool including the cutting insert. Therefore, the present invention is industrially applicable.

REFERENCE SIGNS LIST

1: insert
2: main surface
3: seating surface
3a, 6a, 6b: side ridge portion
4: side surface
5: mounting hole
5a: edge portion
7: projection portion
8: corner cutting edge
9: main cutting edge
15: subsidiary cutting edge
21: acute angle corner portion
22: obtuse angle corner portion
30: tool
31: tool main body
38: clamp screw (fixing member)
CO: central axis
O: rotation axis
P, Q, R, S: end portion
U: change point

What is claimed is:

1. A cutting insert to be detachably mounted on a tip portion of a tool main body rotatable around a rotation axis by using a fixing member, the cutting insert comprising:
a main surface formed in a substantially parallelogram shape in a plan view and having a pair of acute angle corner portions and a pair of obtuse angle corner portions;
a seating surface that faces a side opposite to the main surface;
a side surface that connects the main surface and the seating surface to each other;
a corner cutting edge disposed in the acute angle corner portion; and
a main cutting edge and a subsidiary cutting edge which are respectively disposed in a pair of side ridge portions of the main surface located each other across the acute angle corner portion,
wherein a mounting hole into which the fixing member is to be inserted penetrates the main surface and the seating surface,
wherein the main cutting edge is inclined at an inclination angle equal to or larger than 8° with reference to a plane perpendicular to an axial direction of the mounting hole so as to be closer to a seating surface side in a direction from the acute angle corner portion toward the obtuse angle corner portion,
wherein the main surface has a region inclined in a direction away from the seating surface in a direction from the obtuse angle corner portion toward an edge portion of the mounting hole along a diagonal line connecting the pair of obtuse angle corner portions to each other,
wherein in a cross section along the diagonal line connecting the pair of obtuse angle corner portions to each other, the main surface has a projection portion projecting upward from a straight line connecting the obtuse angle corner portion and the edge portion of the mounting hole to each other,
wherein when viewed in the axial direction of the mounting hole, the projection portion is located on the diagonal line, and
wherein a foot portion of the projection portion on an obtuse angle corner portion side and a foot portion of the projection portion on a mounting hole side are located closer to the seating surface than the straight line.

2. The cutting insert according to claim 1,
wherein when viewed in the axial direction of the mounting hole, the projection portion overlaps a side ridge portion of the seating surface, or is located inside the side ridge portion of the seating surface.

3. The cutting insert according to claim 1,
wherein the main surface has a rake face of the main cutting edge, and
wherein a rake angle of the rake face is inclined to a positive angle side in an end portion on an acute angle corner portion side of the main cutting edge, and gradually increases to a negative angle side in a direction from the end portion on the acute angle corner portion side toward an end portion on an obtuse angle corner portion side, and is inclined to the negative angle side in the end portion on the obtuse angle corner portion side.

4. The cutting insert according to claim 3,
wherein a change point where the rake angle of the rake face is changed from inclination to the positive angle side to inclination to the negative angle side is located close to the obtuse angle corner portion in a longitudinal direction of the main cutting edge.

5. The cutting insert according to claim 1,
wherein when a distance from the seating surface along the axial direction of the mounting hole in an end portion on an acute angle corner portion side of the main cutting edge is set as L1, and
when a distance from the seating surface along the axial direction of the mounting hole in an end portion on an obtuse angle corner portion side of the main cutting edge is set as L2, relationships expressed by the following equations are satisfied $$0.4 \leq L2/L1 \leq 0.7$$

$$2.0 \text{ mm} \leq L2 \leq 3.9 \text{ mm}.$$

6. An indexable edge rotary cutting tool comprising:
a tool main body rotatable around a rotation axis;
a mounting seat formed in a tip portion of the tool main body in an axial direction of the rotation axis; and a cutting insert detachably mounted on the mounting seat and having a corner cutting edge, a main cutting edge and a subsidiary cutting edge, wherein as the cutting insert, the cutting insert according to claim 1 is used, and wherein a rake angle in an axial direction of the main cutting edge of the cutting insert when mounted to the indexable edge rotary cutting tool's mounting seat is equal to or larger than 15°.

7. The cutting insert according to claim 2, wherein the main surface has a rake face of the main cutting edge, and wherein a rake angle of the rake face is inclined to a positive angle side in an end portion on an acute angle corner portion side of the main cutting edge, and gradually increases to a negative angle side in a direction from the end portion on the acute angle corner portion side toward an end portion on an obtuse angle corner portion side, and is inclined to the negative angle side in the end portion on the obtuse angle corner portion side.

8. The cutting insert according to claim 7, wherein a change point where the rake angle of the rake face is changed from inclination to the positive angle side to inclination to the negative angle side is located close to the obtuse angle corner portion in a longitudinal direction of the main cutting edge.

9. The cutting insert according to claim 2, wherein when a distance from the seating surface along the axial direction of the mounting hole in an end portion on an acute angle corner portion side of the main cutting edge is set as L1, and when a distance from the seating surface along the axial direction of the mounting hole in an end portion on an obtuse angle corner portion side of the main cutting edge is set as L2, relationships expressed by the following equations are satisfied $0.4 \leq L2/L1 \leq 0.7$ $2.0 \text{ mm} \leq L2 \leq 3.9 \text{ mm}.$

10. The cutting insert according to claim 3, wherein when a distance from the seating surface along the axial direction of the mounting hole in an end portion on an acute angle corner portion side of the main cutting edge is set as L1, and when a distance from the seating surface along the axial direction of the mounting hole in an end portion on an obtuse angle corner portion side of the main cutting edge is set as L2, relationships expressed by the following equations are satisfied $0.4 \leq L2/L1 \leq 0.7$ $2.0 \text{ mm} \leq L2 \leq 3.9 \text{ mm}.$

11. The cutting insert according to claim 4, wherein when a distance from the seating surface along the axial direction of the mounting hole in an end portion on an acute angle corner portion side of the main cutting edge is set as L1, and when a distance from the seating surface along the axial direction of the mounting hole in an end portion on an obtuse angle corner portion side of the main cutting edge is set as L2, relationships expressed by the following equations are satisfied $0.4 \leq L2/L1 \leq 0.7$ $2.0 \text{ mm} \leq L2 \leq 3.9 \text{ mm}.$

12. The cutting insert according to claim 7, wherein when a distance from the seating surface along the axial direction of the mounting hole in an end portion on an acute angle corner portion side of the main cutting edge is set as L1, and when a distance from the seating surface along the axial direction of the mounting hole in an end portion on an obtuse angle corner portion side of the main cutting edge is set as L2, relationships expressed by the following equations are satisfied $0.4 \leq L2/L1 \leq 0.7$ $2.0 \text{ mm} \leq L2 \leq 3.9 \text{ mm}.$

13. The cutting insert according to claim 8, wherein when a distance from the seating surface along the axial direction of the mounting hole in an end portion on an acute angle corner portion side of the main cutting edge is set as L1, and when a distance from the seating surface along the axial direction of the mounting hole in an end portion on an obtuse angle corner portion side of the main cutting edge is set as L2, relationships expressed by the following equations are satisfied $0.4 \leq L2/L1 \leq 0.7$ $2.0 \text{ mm} \leq L2 \leq 3.9 \text{ mm}.$

14. An indexable edge rotary cutting tool comprising:

a tool main body rotatable around a rotation axis;

a mounting seat formed in a tip portion of the tool main body in an axial direction of the rotation axis; and a cutting insert detachably mounted on the mounting seat and having a corner cutting edge, a main cutting edge and a subsidiary cutting edge, wherein, as the cutting insert, the cutting insert according to claim 2 is used, and wherein a rake angle in an axial direction of the main cutting edge of the cutting insert when mounted to the indexable edge rotary cutting tool's mounting seat is equal to or larger than 15°.

15. An indexable edge rotary cutting tool comprising:

a tool main body rotatable around a rotation axis;

a mounting seat formed in a tip portion of the tool main body in an axial direction of the rotation axis; and a cutting insert detachably mounted on the mounting seat and having a corner cutting edge, a main cutting edge and a subsidiary cutting edge, wherein as the cutting insert, the cutting insert according to claim 3 is used, and wherein a rake angle in an axial direction of the main cutting edge of the cutting insert when mounted to the indexable edge rotary cutting tool's mounting seat is equal to or larger than 15°.

16. An indexable edge rotary cutting tool comprising:

a tool main body rotatable around a rotation axis;

a mounting seat formed in a tip portion of the tool main body in an axial direction of the rotation axis; and a cutting insert detachably mounted on the mounting seat and having a corner cutting edge, a main cutting edge and a subsidiary cutting edge, wherein as the cutting insert, the cutting insert according to claim 4 is used, and wherein a rake angle in an axial direction of the main cutting edge of the cutting insert when mounted to the indexable edge rotary cutting tool's mounting seat is equal to or larger than 15°.

17. An indexable edge rotary cutting tool comprising:
a tool main body rotatable around a rotation axis;
a mounting seat formed in a tip portion of the tool main body in an axial direction of the rotation axis; and
a cutting insert detachably mounted on the mounting seat and having a corner cutting edge, a main cutting edge and a subsidiary cutting edge,
wherein as the cutting insert, the cutting insert according to claim 5 is used, and
wherein a rake angle in an axial direction of the main cutting edge of the cutting insert when mounted to the indexable edge rotary cutting tool's mounting seat is equal to or larger than 15°.

18. An indexable edge rotary cutting tool comprising:
a tool main body rotatable around a rotation axis;
a mounting seat formed in a tip portion of the tool main body in an axial direction of the rotation axis; and
a cutting insert detachably mounted on the mounting seat and having a corner cutting edge, a main cutting edge and a subsidiary cutting edge,
wherein as the cutting insert, the cutting insert according to claim 7 is used, and
wherein a rake angle in an axial direction of the main cutting edge of the cutting insert when mounted to the indexable edge rotary cutting tool's mounting seat is equal to or larger than 15°.

19. An indexable edge rotary cutting tool comprising:
a tool main body rotatable around a rotation axis;
a mounting seat formed in a tip portion of the tool main body in an axial direction of the rotation axis; and
a cutting insert detachably mounted on the mounting seat and having a corner cutting edge, a main cutting edge and a subsidiary cutting edge,
wherein as the cutting insert, the cutting insert according to claim 8 is used, and
wherein a rake angle in an axial direction of the main cutting edge of the cutting insert when mounted to the indexable edge rotary cutting tool's mounting seat is equal to or larger than 15°.

20. An indexable edge rotary cutting tool comprising:
a tool main body rotating rotatable around a rotation axis;
a mounting seat formed in a tip portion of the tool main body in an axial direction of the rotation axis; and
a cutting insert detachably mounted on the mounting seat and having a corner cutting edge, a main cutting edge and a subsidiary cutting edge,
wherein as the cutting insert, the cutting insert according to claim 9 is used, and
wherein a rake angle in an axial direction of the main cutting edge of the cutting insert when mounted to the indexable edge rotary cutting tool's mounting seat is equal to or larger than 15°.

* * * * *